United States Patent
Niu et al.

(10) Patent No.: US 7,929,918 B2
(45) Date of Patent: Apr. 19, 2011

(54) SYSTEM AND METHOD FOR TRAINING THE SAME TYPE OF DIRECTIONAL ANTENNAS THAT ADAPTS THE TRAINING SEQUENCE LENGTH TO THE NUMBER OF ANTENNAS

(75) Inventors: Huaning Niu, Milpitas, CA (US); Pengfei Xia, Mountain View, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 444 days.

(21) Appl. No.: 12/189,749

(22) Filed: Aug. 11, 2008

(65) Prior Publication Data

US 2009/0046012 A1 Feb. 19, 2009

Related U.S. Application Data

(60) Provisional application No. 60/955,613, filed on Aug. 13, 2007.

(51) Int. Cl.
*H04B 1/00* (2006.01)

(52) U.S. Cl. .............. 455/69; 455/562.1; 455/276.1; 455/277.1; 455/575.7; 455/63.3; 455/101; 375/267; 375/269; 375/316; 342/367; 342/372; 342/368; 342/360; 342/377; 342/374; 370/338; 343/853

(58) Field of Classification Search .............. 455/69, 455/562.1, 276.1, 277.1, 575.7, 63.3, 110
See application file for complete search history.

(56) References Cited

U.S. PATENT DOCUMENTS

| | | | |
|---|---|---|---|
| 5,955,991 | A | 9/1999 | Kawakubo |
| 6,590,532 | B1 | 7/2003 | Ogawa et al. |
| 6,721,908 | B1 | 4/2004 | Kim et al. |
| 6,731,689 | B2 | 5/2004 | Dogan |
| 6,795,392 | B1 | 9/2004 | Li et al. |
| 6,847,832 | B2 | 1/2005 | Wong et al. |

(Continued)

FOREIGN PATENT DOCUMENTS

EP 1267501 A 12/2002

(Continued)

OTHER PUBLICATIONS

Butler et al., "Beam-Forming Matrix Simplifies Design of Electronically Scanned Antennas." Electronic Design, Apr. 12, 1961, pp. 170-173.

(Continued)

*Primary Examiner* — Marceau Milord
(74) *Attorney, Agent, or Firm* — Kenneth L. Sherman, Esq.; Michael Zarrabian, Esq.; Myers Andras Sherman & Zarrabian LLP

(57) ABSTRACT

Systems and methods of training antennas for two devices equipped with phased array antennas in a wireless network are disclosed. In one embodiment, the methods include transmitting a plurality of estimation training sequences from a transmit phased array antenna to a receive phased array antenna, wherein a length of at least one of the plurality of training sequences is adapted to a number of antenna elements at one of the transmit and receive phased array antennas. The methods further include transmitting data to the receive phased array antenna via the transmit phased array antenna tuned with a transmit beamforming vector (BV) selected based at least in part on the plurality of estimation training sequences.

30 Claims, 10 Drawing Sheets

U.S. PATENT DOCUMENTS

| | | |
|---|---|---|
| 6,937,189 B2 | 8/2005 | Kim |
| 7,013,165 B2 | 3/2006 | Yoon et al. |
| 7,039,370 B2 | 5/2006 | Laroia et al. |
| 7,099,678 B2 * | 8/2006 | Vaidyanathan ............... 455/500 |
| 7,148,845 B2 * | 12/2006 | Rooyen et al. ................. 342/377 |
| 7,161,534 B2 | 1/2007 | Tsai et al. |
| 7,194,237 B2 * | 3/2007 | Sugar et al. ...................... 455/39 |
| 7,239,893 B2 * | 7/2007 | Yang ............................... 455/561 |
| 7,312,750 B2 | 12/2007 | Mao et al. |
| 7,342,535 B2 | 3/2008 | Ann et al. |
| 7,411,547 B2 * | 8/2008 | van Rooyen et al. .......... 342/377 |
| 7,446,698 B2 * | 11/2008 | Bast ............................... 342/174 |
| 7,450,659 B2 | 11/2008 | Corredoura et al. |
| 7,480,497 B2 * | 1/2009 | Biswas et al. .............. 455/168.1 |
| 7,547,778 B2 * | 6/2009 | Balducci et al. ............... 540/536 |
| 7,605,755 B2 * | 10/2009 | van Rooyen et al. .......... 342/377 |
| 7,627,051 B2 * | 12/2009 | Shen et al. ...................... 375/267 |
| 7,657,244 B2 * | 2/2010 | Niu et al. ...................... 455/277.1 |
| 7,710,925 B2 * | 5/2010 | Poon ............................... 370/334 |
| 7,714,783 B2 * | 5/2010 | Niu et al. ....................... 342/377 |
| 7,839,819 B2 * | 11/2010 | Kim ............................... 370/329 |
| 2002/0122498 A1 | 9/2002 | Dogan |
| 2002/0147032 A1 | 10/2002 | Yoon et al. |
| 2003/0201936 A1 | 10/2003 | Kim |
| 2004/0218581 A1 | 11/2004 | Cattaneo |
| 2005/0068231 A1 | 3/2005 | Regnier et al. |
| 2005/0206564 A1 | 9/2005 | Mao et al. |
| 2005/0276347 A1 | 12/2005 | Mujtaba et al. |
| 2006/0012520 A1 | 1/2006 | Tsai et al. |
| 2006/0104382 A1 | 5/2006 | Yang et al. |
| 2006/0234645 A1 | 10/2006 | Lin et al. |
| 2006/0248429 A1 | 11/2006 | Grandhi et al. |
| 2007/0189412 A1 | 8/2007 | Xia et al. |
| 2007/0205943 A1 | 9/2007 | Nassiri-Toussi et al. |
| 2008/0101493 A1 | 5/2008 | Niu et al. |
| 2008/0108390 A1 | 5/2008 | Yoon et al. |
| 2008/0134254 A1 | 6/2008 | Xia et al. |
| 2008/0144751 A1 | 6/2008 | Xia et al. |
| 2008/0204319 A1 | 8/2008 | Niu et al. |
| 2009/0033555 A1 | 2/2009 | Niu et al. |
| 2009/0046010 A1 | 2/2009 | Niu et al. |
| 2009/0047910 A1 | 2/2009 | Niu et al. |
| 2009/0058724 A1 | 3/2009 | Xia et al. |
| 2009/0121935 A1 | 5/2009 | Xia et al. |
| 2009/0189812 A1 | 7/2009 | Xia et al. |
| 2009/0193300 A1 | 7/2009 | Xia et al. |
| 2009/0238156 A1 | 9/2009 | Yong et al. |
| 2010/0009635 A1 | 1/2010 | Qin et al. |

FOREIGN PATENT DOCUMENTS

| | | |
|---|---|---|
| JP | 2004/140642 A2 | 5/2004 |
| KR | 2000/0071545 A | 11/2000 |
| KR | 2001/0015765 | 2/2001 |
| KR | 2001/0018995 A | 3/2001 |
| KR | 2002/0022109 A | 3/2002 |
| KR | 2006/0068921 A | 6/2006 |
| WO | WO 01/17131 | 3/2001 |
| WO | WO 03/090386 | 10/2003 |

OTHER PUBLICATIONS

Buzzi S. et al., Performance of iterative data detection and channel estimation for single-antenna and multiple-antennae wireless communications, IEEE Transactions on Vehicular Technology, Jul. 2004, 53(4): 1085-1104.

Caetano, Lianne, SiBEAM—60 GHz Architecture for Wireless Video Display, SiBEAM, Inc. White Paper, Mar. 2006, [Available online: http://www.sibeam.com/whtpapers/60_GHz_for_WirelessHD_3_06.pdf], pp. 1-6.

Coffey, S. et al., "Joint Proposal: High throughput extension to the 802.11 Standard: PHY" IEEE 802.11-05/1102r4, draft proposal, Jan. 2006, pp. 1-82.

De Los Santos, "MEMS-Based Microwave Circuits and Systems, Introduction to Microelectromechanical (MEM) Microwave Systems," Artech House, p. 167-168 and 193, 1999.

Furrer et al., Bounds on the ergodic capacity of training-based multiple-antenna systems, Proceedings, Internal Symposium on Information Theory, ISIT, Sep. 2005, p. 780-784.

Hachman, "CE Giants back Amimon's Wireless HDTV Tech," online: www.pcmag.com, 1 page, Jul. 23, 2008.

Hansen, R.C., Phased Array Antennas, John Wiley and Songs, New York, 1998, pp. 1-507.

Hitachi et al., High-Definition Multimedia Interface (HDMI) Specifications version 1.2, Aug. 22, 2005, pp. 1-214.

IEEE 802.11 Working Group of the 802 Committee, "Draft Amendment to Standard for Information Technology-Telecommunications and information exchange between systems-Local and metropolitan are networks- Specific requirements—Part 11: Wireless LAN Medium Access Control (MAC) and Physical Layer (PHY) specifications: Enhancements for Higher Throughput," IEEE P802.11n/D1.0, Mar. 2006, pp. 1-335.

LG Electronics Inc., WirelessHD Specification Version 1.0 Overview, Oct. 9, 2007, 77 pages.

Lin et al., Error Control Coding—Fundamentals and Applications, 2nd Edition, Pearson Prentice Hall, 2004, Chapter 16, pp. 774-780.

NEC develops compact millimeter-wave transceiver for uncompressed HDTV signal transmission, NE Asia Online, Apr. 5, 2005, (Downloaded from http://neasia.nikkeibp.com/topstory/000913 on Sep. 29, 2006).

Niu et al., "Beamforming for Space-Time Coded IEEE 802.11n System with Known Fading Correlations," in Proceeding of 39th Asilomar Conference on Signals, Systems and Computers, Pacific Grove, CA, Nov. 2005.

Project: IEEE P802.15 Working Group for Wireless Personal Area Networks (WPANs), Presentations, Nov. 12, 2006 & Jan. 15, 2008, pp. 1-64.

Razavi, B., "Challenges in Portable RF Transceiver Design." Circuits & Devices, 8755-3996/96, IEEE, Sep. 1996, pp. 12-24.

Rye et al., On Quadratic Inverses for Quadratic Permutation Polynomials Over Integer Rings, IEEE Trans. on Information Theory, Mar. 2006, 52(3): 1-12.

Scintera, "Advanced Signal Processing Platform," Scintera Networks, Sep. 2003, pp. 1-9.

Stüber, G. et al., "Broadband MIMO-OFDM Wireless Communications", Proceedings of the IEEE, vol. 92, No. 2, Feb. 2004, pp. 271-294.

Takeshita et al., On Maximum Contention-Free Interleavers and Permutation Polynomials Over Integer Rings, IEEE Trans. on Information Theory, Mar. 2006, 52(3): 1-13.

Van Veen et al., Beamforming: A Versatile Approach to Spatial Filtering, IEEE ASSP Magazine, Apr. 1988, 5(2): 4-24.

International Search Report and Written Opinion dated Aug. 28, 2009 for PCT/KR2009/000365, filed Jan. 23, 2009.

International Search Report dated Jun. 29, 2009 for PCT Application No. PCT/KR2009/000373, filed Jan. 23, 2009.

International Search Report dated Sep. 16, 2009 for PCT Application No. PCT/KR2009/00576, filed Feb. 6, 2009.

U.S. Office Action dated Jun. 23, 2008 in U.S. Appl. No. 11/890,207, filed Aug. 2, 2007.

U.S. Office Action dated Nov. 24, 2008 in U.S. Appl. No. 11/890,207, filed Aug. 2, 2007.

U.S. Advisory Action dated Mar. 2, 2009 in U.S. Appl. No. 11/890,207, filed Aug. 2, 2007.

U.S. Office Action dated Apr. 6, 2009 in U.S. Appl. No. 11/890,207, filed Aug. 2, 2007.

U.S. Office Action dated Jul. 25, 2008 in U.S. Appl. No. 11/881,978, filed Jul. 30, 2007.

U.S. Office Action dated Jan. 2, 2009 in U.S. Appl. No. 11/881,978, filed Jul. 30, 2007.

U.S. Notice of Allowance dated Sep. 15, 2009 in U.S. Appl. No. 11/881,978, filed Jul. 30, 2007.

U.S. Office Action dated Sep. 24, 2009 in U.S. Appl. No. 11/899,286, filed Sep. 5, 2007.

U.S. Notice of Allowance dated Jan. 21, 2010 in U.S. Appl. No. 11/899,286, filed Sep. 5, 2007.

U.S. Office Action dated Oct. 15, 2009 in U.S. Appl. No. 11/706,942, filed Feb. 13, 2007.

IEEE 802.15.3: Wireless Medium Access Control (MAC) and Physical Layer (PHY) Specifications for High Rate Wireless Personal Area Networks (WPANs), Sep. 29, 2003.

* cited by examiner

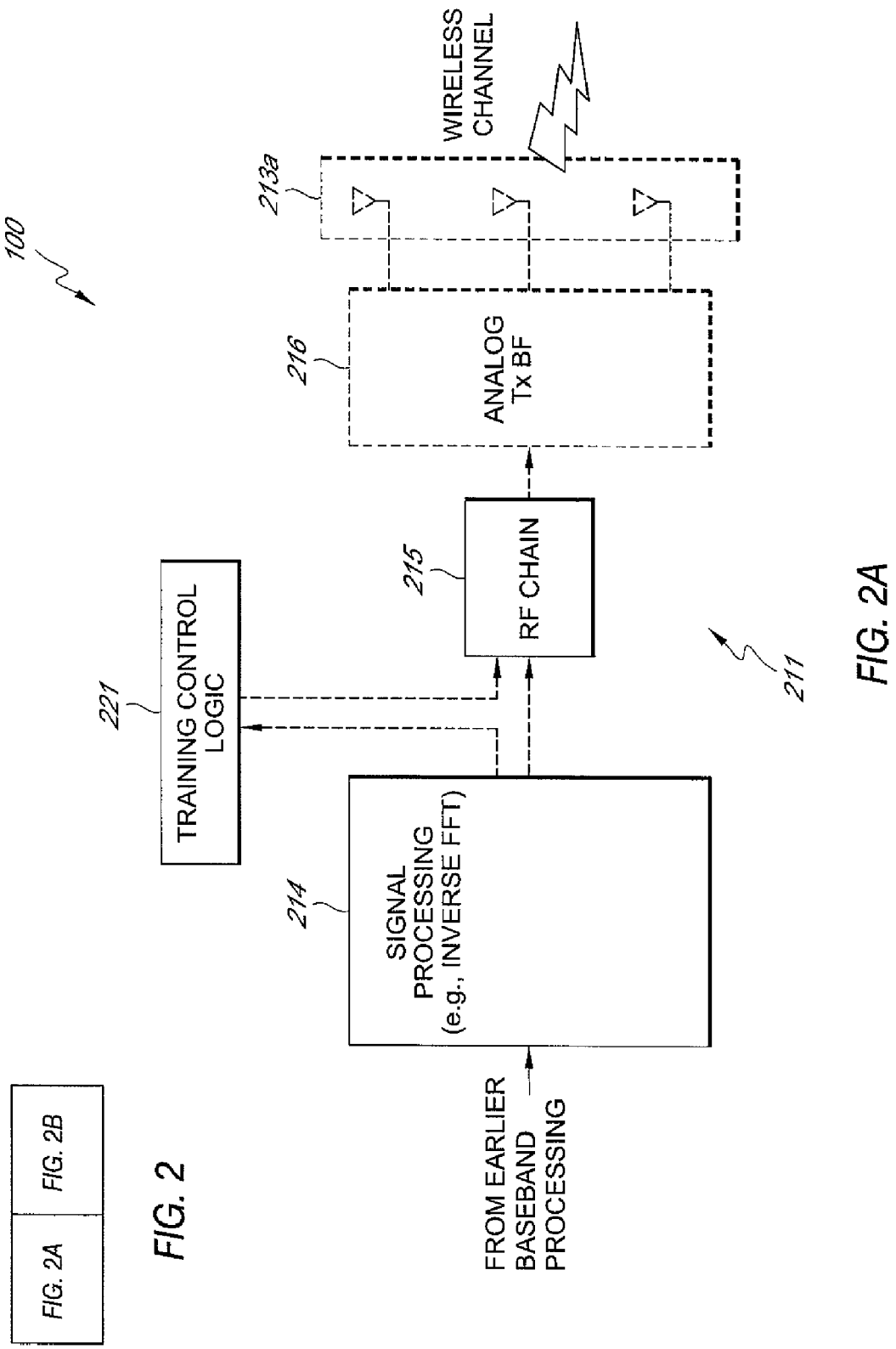

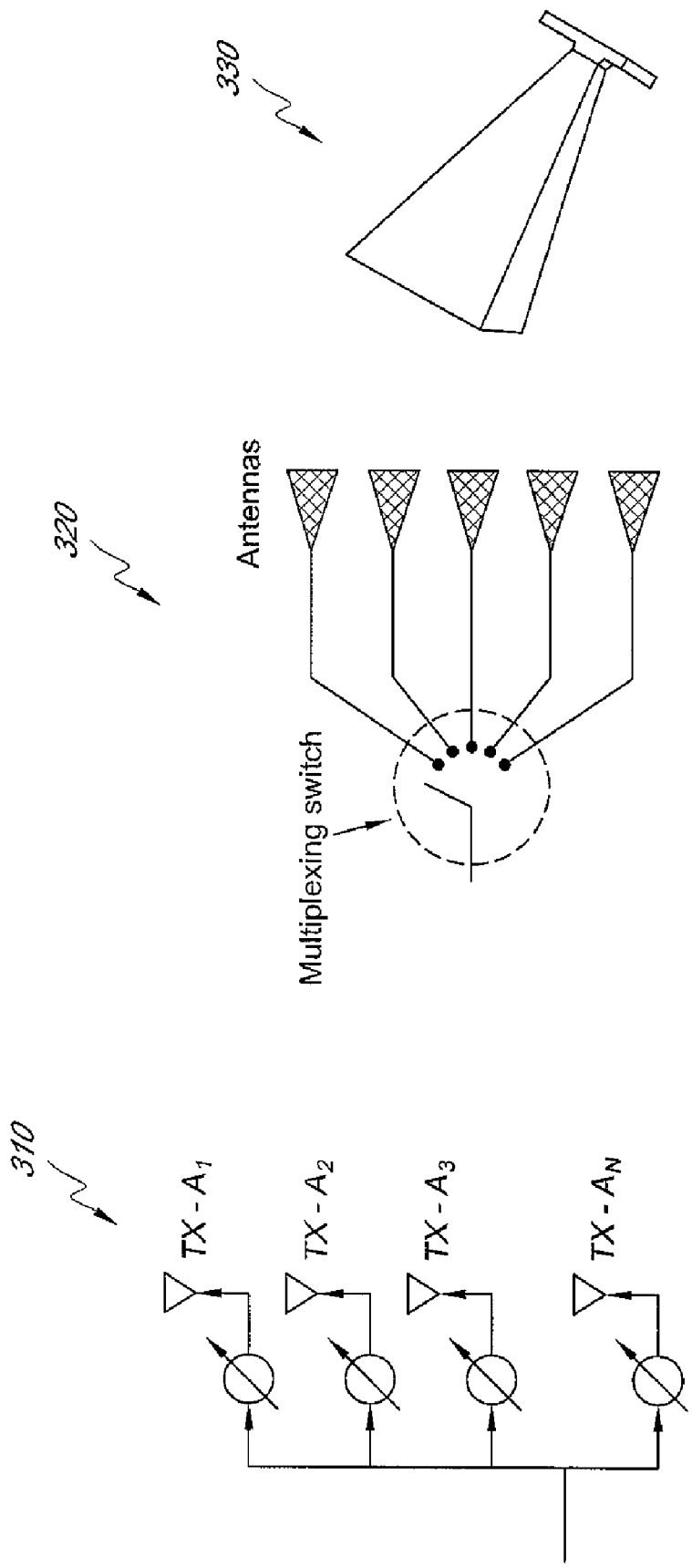

SYSTEM AND METHOD FOR TRAINING THE SAME TYPE OF DIRECTIONAL ANTENNAS THAT ADAPTS THE TRAINING SEQUENCE LENGTH TO THE NUMBER OF ANTENNAS

CROSS-REFERENCE TO RELATED APPLICATIONS

This application claims the benefit under 35 U.S.C. 119(e) of U.S. Provisional Application No. 60/955,613, filed on Aug. 13, 2007, which is incorporated by reference in its entirety.

BACKGROUND OF THE INVENTION

1. Field of the Invention

The present invention relates to wireless networks, and in particular to acquiring the optimal directional transmission in a wireless communication system.

2. Description of the Related Technology

One of the major challenges for millimeter wave (mm-wave) gigabit per second (Gbps) communications is the poor link budget, as a radio signal propagating in the mm-wave frequency band experiences significant path loss, reflection loss and other degradation. Given the lossy nature of the radio channel as well as the limited CMOS performance at a mm-wave band, Gbps communications becomes very challenging. To improve the link quality, directional transmission is generally preferred.

Due to the extremely short wavelength, it becomes possible and beneficial to integrate a large number (e.g., between 10 and 64) of antenna elements into an antenna package. Antenna based beamforming thus emerges as an attractive solution, featuring high beamforming gain and electronic steerability. An improvement in signal-to-noise (S/N) ratio can be achieved by periodically performing antenna trainings in a beamforming wireless system.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly.

In one embodiment, there is a method of training antennas for two devices equipped with phased array antennas in a wireless network, the method comprising a) transmitting a first estimation training sequence of length N2 via a transmit phased array antenna, wherein N2 corresponds to a number of antenna element at a second station (STA2) acting as a receiver and wherein a transmit beamforming vector (BV) of the transmit phased array antenna of a first station (STA1) acting as a transmitter is fixed to a first transmit BV while a receive BV of a receive phased array antenna of STA2 is switched between phase vectors within N2 weight vectors; b) transmitting a second estimation training sequence of a length N1 via the transmit phased array antenna, wherein N1 corresponds to a number of antenna elements at STA1 and wherein the transmit BV is switched between phase vectors within N1 weight vectors while the receive BV of the receive phased array antenna of STA2 is fixed to a first receive BV; c) receiving a feedback message indicative of a first transmit BV for STA1; d) transmitting a next estimation training sequence of length N2, wherein the transmit BV is fixed to the first transmit BV while the receive BV of STA2 is switched between phase vectors within N2 weight vectors; e) transmitting a next estimation training sequence of length N1, wherein the transmit BV is switched between phase vectors within N1 weight vectors while the receive BV is fixed to an updated receive BV vector; f) receiving a next feedback message indicative of a new transmit BV for STA1; g) repeating d)-f) for a finite number of times; and h) transmitting data via the transmit phased array antenna fixed to the last transmit BV indicated by the last feedback message.

In another embodiment, there is a system for training antennas for two devices equipped with phased array antennas in a wireless network, the system comprising a transmit phased array antenna of a first station (STA1) acting as a transmitter; and a processor configured to: a) transmit a first estimation training sequence of length N2 via the transmit phased array antenna, wherein N2 corresponds to a number of antenna element at a second station (STA2) acting as a receiver and wherein a transmit beamforming vector (BV) of the transmit phased array antenna of STA1 acting as a transmitter is fixed to a first transmit BV while a receive BV of a receive phased array antenna of STA2 is switched between phase vectors within N2 weight vectors, b) transmit a second estimation training sequence of a length N1 via the transmit phased array antenna, wherein N1 corresponds to a number of antenna elements at STA1 and wherein the transmit BV is switched between phase vectors within N1 weight vectors while the receive BV of the receive phased array antenna of STA2 is fixed to a first receive BV, c) receive a feedback message indicative of a first transmit BV for STA1, d) transmit a next estimation training sequence of length N2, wherein the transmit BV is fixed to the first transmit BV while the receive BV of STA2 is switched between phase vectors within N2 weight vectors, e) transmit a next estimation training sequence of length N1, wherein the transmit BV is switched between phase vectors within N1 weight vectors while the receive BV is fixed to an updated receive BV vector, f) receive a next feedback message indicative of a next transmit BV for STA1, g) repeat d)-f) for a finite number of times, and h) transmit data via the transmit phased array antenna fixed to the last transmit BV for STA1 indicated by the last feedback message.

In another embodiment, there is a method of training antennas for two devices equipped with phased array antennas in a wireless network, the method comprising a) transmitting a first transmit estimation training sequence of length N2 via a transmit phased array antenna, wherein N2 corresponds to a number of antenna element at a second station (STA2) acting as a receiver and wherein a transmit beamforming vector (BV) of the transmit phased array antenna of a first station (STA1) acting as a transmitter is fixed to a first transmit BV while a receive BV of a receive phased array antenna of STA2 is switched between phase vectors within N2 weight vectors; b) receiving a first receive estimation training sequence of length N1 from STA2, wherein N1 corresponds to a number of antenna elements at STA1 and wherein a transmit BV of the phased array antenna of STA2 acting as a transmitter is fixed to a first transmit BV while the receive BV of the phased array antenna of STA1 acting as a receiver is switched between phased vectors within N1 weight vectors; c) transmitting a next transmit estimation training sequence of length N2 via the transmit phased array antenna, wherein the transmit beamforming vector (BV) is fixed to a new transmit BV while the receive BV is switched between phase vectors within N2 weight vectors; d) receiving a next receive estimation training sequence of length N1 from STA2, wherein the transmit BV of the phased array antenna of STA2 acting as a transmitter is fixed to a new transmit BV while the receive BV of the phased array antenna of STA1 acting as a receiver is switched between phased vectors within N1 weight vectors; e) repeating c)-d) for a finite number of times; and f) transmitting data via the transmit phased array antenna fixed to a selected transmit BV.

In another embodiment, there is a system for training antennas for two devices equipped with phased array antennas in a wireless network, the system comprising a transmit phased array antenna of a first station (STA1) acting as a transmitter; and a processor configured to: a) transmit a first transmit estimation training sequence of length N2 via the transmit phased array antenna, wherein N2 corresponds to a number of antenna element at a second station (STA2) acting as a receiver and wherein a transmit beamforming vector (BV) of the transmit phased array antenna is fixed to a first transmit BV while a receive BV of a receive phased array antenna of STA2 is switched between phase vectors within N2 weight vectors, b) receive a first receive estimation training sequence of length N1 from STA2, wherein N1 corresponds to a number of antenna elements at STA1 and wherein a transmit BV of the phased array antenna of STA2 acting as a transmitter is fixed to a first transmit BV while the receive BV of the phased array antenna of STA1 acting as a receiver is switched between phased vectors within N1 weight vectors, c) transmit a next transmit estimation training sequence of length N2 via the transmit phased array antenna, wherein the transmit beamforming vector (BV) is fixed to a new transmit BV while the receive BV is switched between phase vectors within N2 weight vectors, d) receive a next receive estimation training sequence of length N1 from STA2, wherein the transmit BV of the phased array antenna at STA2 acting as a transmitter is fixed to a new transmit BV while the receive BV of the phased array antenna at STA1 acting as a receiver is switched between phased vectors within N1 weight vectors, e) repeat c)-d) for a finite number of times, and f) transmit data via the transmit phased array antenna fixed to a selected transmit BV.

In another embodiment, there is a method of training antennas for two devices equipped with switched array antennas in a wireless network, the method comprising: a) transmitting a first estimation training sequence of length N1 via a transmit switched array antenna, wherein N1 corresponds to a number of transmit antenna sectors for the transmit switched array antenna at a first station (STA1) acting as a transmitter and wherein the transmit switched array antenna is switched between N1 transmit antenna sectors while a receive switched array antenna at a second station (STA2) acting as a receiver is fixed to a first receive antenna sector; b) transmitting a next estimation training sequence of length N1 via the transmit switched array antenna and wherein the transmit switched array antenna at STA1 is switched between N1 transmit antenna sectors while the receive switched array antenna at STA2 is fixed to a new receive antenna sector; c) repeating b) for a finite number of times; d) receiving a feedback message indicative of a transmit antenna sector for STA1; e) transmitting data via the transmit switched array antenna fixed to the transmit antenna sector indicated by the feedback message.

In another embodiment, there is a system for training antennas for two devices equipped with switched array antennas in a wireless network, the system comprising a transmit switched array antenna of a first station (STA1) acting as a transmitter; and a processor configured to: a) transmit a first estimation training sequence of length N1 via the transmit switched array antenna, wherein N1 corresponds to a number of transmit antenna sectors for the transmit switched array antenna at a first station (STA1) acting as a transmitter and wherein the transmit switched array antenna is switched between N1 transmit antenna sectors while a receive switched array antenna at a second station (STA2) acting as a receiver is fixed to a first receive antenna sector, b) transmit a next estimation training sequence of length N1 via the transmit switched array antenna and wherein the transmit switched array antenna at STA1 is switched between N1 transmit antenna sectors while the receive switched array antenna at STA2 is fixed to a new receive antenna sector; c) repeat b) for a finite number of times; e) receive a feedback message indicative of a transmit antenna sector for STA1; f) transmit data via the transmit switched array antenna fixed to the transmit antenna sector indicated by the feedback message.

BRIEF DESCRIPTION OF THE DRAWINGS

FIGS. 3(a)-(c) are diagrams showing examples of different types of directional antenna that can be incorporated in transmit or receive devices such as the ones shown in FIG. 2.

FIG. 4 is a diagram showing an example Physical Layer (PHY) capability information element (IE) of a device and a coordinator that can be included in an association request and response commands, respectively.

FIG. 5 is a diagram showing an example antenna support element that can be included in a PHY capability IE such as the one shown in FIG. 4.

FIG. 6 is a diagram showing an example training sequence where the training sequence length is adapted to a particular type and number of antennas.

DETAILED DESCRIPTION OF CERTAIN INVENTIVE EMBODIMENTS

Certain embodiments provide a method and system for an efficient transmit and receive beamforming protocol that adapts the training sequence length on the number of antennas. In some embodiments, the training overhead associated with beamforming directional antennas can be reduced by the system and method described below.

The following detailed description is directed to certain sample embodiments of the invention. However, the invention can be embodied in a multitude of different ways as defined and covered by the claims. In this description, reference is made to the drawings wherein like parts are designated with like numerals throughout.

Various embodiments of the beamforming protocol for heterogeneous directional antennas described herein can be applied to various wireless standards including IEEE 802.15.3c and ECMA TC48 standards on mm-wave communication networks and are able to support transmit-receive devices that may use different antenna types with varying number of antenna elements. In addition, the training overhead can be minimized by adapting the training sequence length to the number of antenna elements.

The beamforming protocol described herein can support directional transmissions between diverse antenna configurations, including a switched (sectored) array antenna, a phased array antenna, and a single antenna element. Antenna training protocols for homogeneous antenna configurations involving the same types of antennas (e.g., the phased array antennas) at both the transmit and receive devices have been disclosed in U.S. patent application Ser. No. 11/881,978, entitled "Method and System For Analog Beamforming In Wireless Communication System", filed on Jul. 30, 2007, herein incorporated by reference in its entirety. Beamforming protocols for heterogeneous antenna configurations, including the following two example antenna configurations, will be described below:

The transmit device (STA1) transmits data via a phased array antenna having N1 antenna elements, and the receive device (STA2) receives the data via a switched array antenna having N2 antenna elements; and The transmit device (STA1) transmits data via a switched array antenna having N1 antenna elements, and the receive device (STA2) receives the data transmitted by the STA2 via a phased array antenna having N2 antenna elements.

Data wirelessly transmitted between devices via antennas trained with certain embodiments of the beamforming protocol described herein may include one or more of motion video, still images, or any other suitable type of multimedia data.

Figure 1:
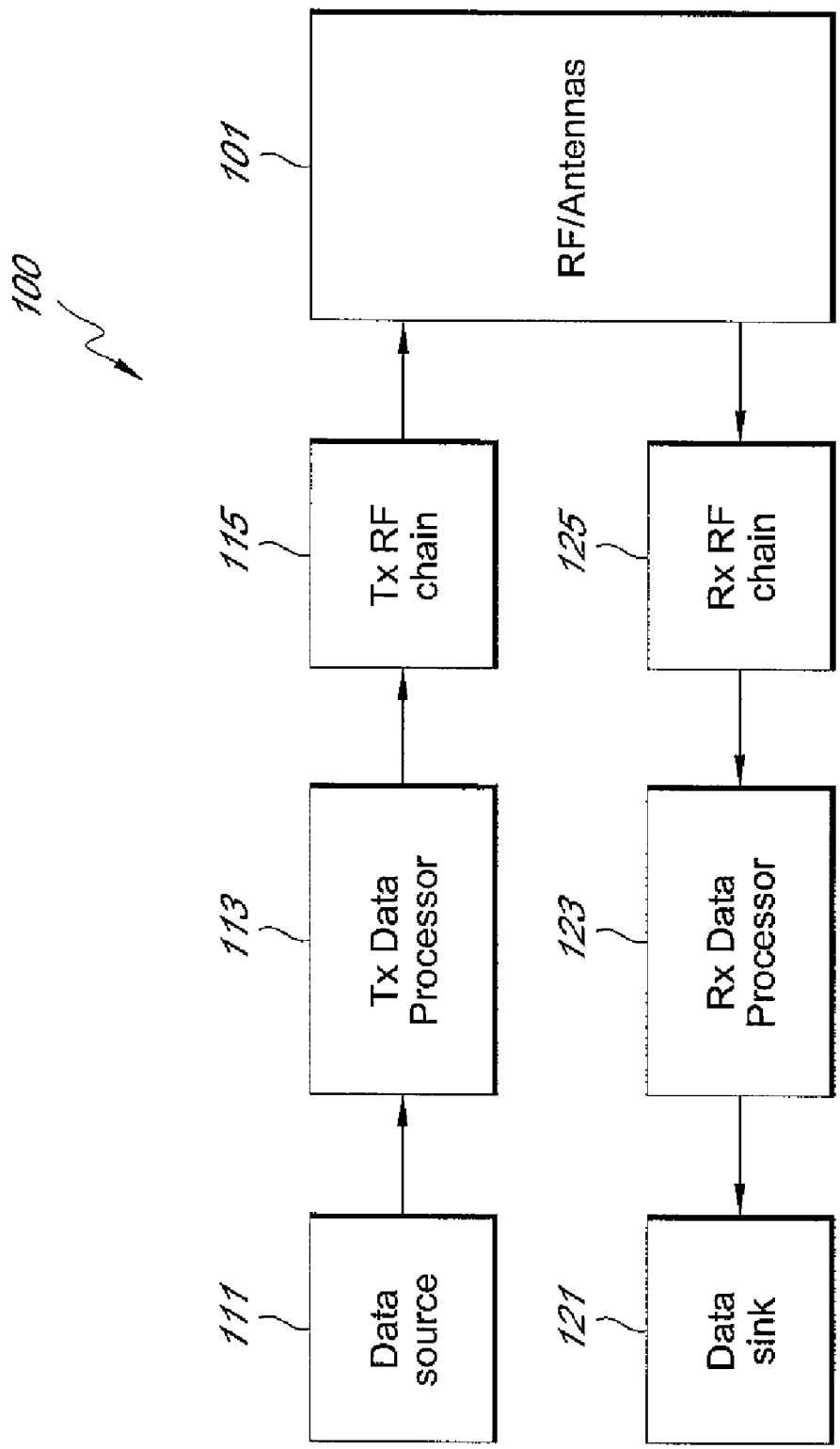
FIG. 1 is a functional block diagram illustrating an example transceiver structure that can represent a communication device incorporating the efficient beamforming protocol in a wireless system according to certain embodiments.

FIG. 1 is a functional block diagram illustrating an example transceiver structure 100 of communication devices that can transmit as well as receive data. The transceiver structure 100 includes a data source 111, a transmit (TX) data processor 113, a TX radio frequency (RF) chain 115, a receive (RX) RF chain 125, a RX data processor 123, a data sink 121, and RF/Antennas module 101.

The operation of the transceiver structure 100 in the transmit mode is now described. In certain embodiments, the data source 111 includes one or more memories for storing data to be transmitted. The TX data processor 113 receives the data from the data source 111 and processes the received data. The data processing can include, for example, an inverse Fast Fourier Transform (FFT), data compression, or security encoding performed in the digital domain. The TX RF chain 115 receives the processed digital data and converts it into an analog data waveform. The RF/Antennas module 101 includes a transmit antenna and TX RF electronics (not shown). The RF/Antennas module 101 receives the analog data waveform and, after the TX RF electronics perform additional analog signal processing, e.g., baseband mixing and amplification, on the analog data waveform, the transmit antenna wirelessly transmits the analog data waveform.

The operation of the transceiver structure 100 in the receive mode is now described. The RF/Antennas module 111 includes a receive antenna and RX RF electronics (not shown). The receive antenna receives an analog data waveform and the RX RF electronics performs additional analog signal processing, e.g., amplification and baseband de-mixing. The RX RF chain 125 receives the analog data waveform from the RF/Antennas module 101 and converts it into digital data. The RX data processor 123 receives the digital data from the RX RF chain 125 and processes the received data. The data processing can include a FFT, data decompression, or security decoding performed in the digital domain. The processed data is then stored in the data sink 121.

Figure 2B:
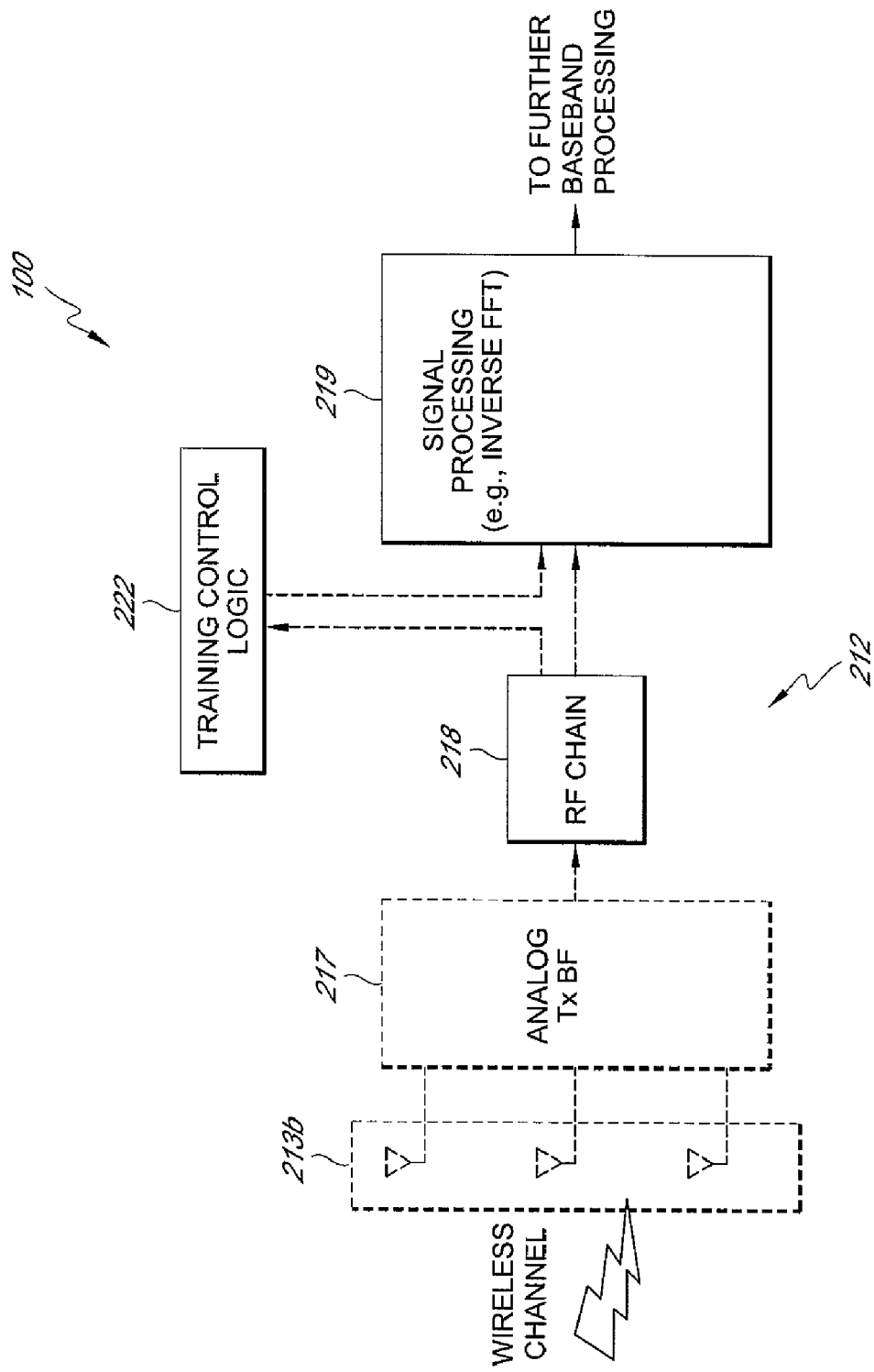
FIG. 2 is a functional block diagram of an example beamforming wireless system comprising two beamforming communication devices—a transmitter and a receiver—that are configured to perform an antenna training session prior to transmitting data using the trained antennas.

Before a pair of communication devices, e.g., transmit and receive devices, with directional antennas engaging in data communication, the devices typically perform an antenna training process in order to improve the signal-to-noise ratio through beamforming. The antenna training process includes estimation of the antenna weighting coefficients of the directional antennas belonging to the transmitters and receivers. As used herein, beamforming refers to applying appropriate weighting coefficients for different antenna elements of the antenna. FIG. 2 is a functional block diagram of an example beamforming wireless system 200 comprising two beamforming communication devices—a transmitter 211 and a receiver 212—that are configured to perform an antenna training session prior to transmitting data via beamforming, e.g., audio and/or video (A/V) data. The transmitter 211 and receiver 212 include transmit and receive antennas 213a and 213b, respectively. In the illustrated example, the beamforming wireless system 200 is an analog beamforming wireless system as the beamforming (antenna weighting) operation is carried out in the analog domain. However, it will be appreciated that the system 200 can be a digital beamforming wireless system. In some embodiments, each of the transmitter and receiver contains a directional antenna comprising multiple antenna elements.

FIGS. 3(a)-(c) show different types of directional antennas that can be incorporated in transmit or receive devices such as the ones shown in FIG. 2. In some embodiments, the directional antenna includes a phased array antenna 310 represented by FIG. 3(a). In other embodiments, the directional antenna includes a switched array antenna 320 represented by FIG. 3(b). In yet other embodiments, the directional antenna includes a single element directional antenna 330 represented by FIG. 3(c). Various embodiments of the beamforming protocol for heterogeneous directional antennas described herein utilize different types of directional antennas at the transmitter and the receiver. For example, in certain embodiments, the transmit antenna 213a (FIG. 2) at the transmitter 211 can be the phased array antenna 310, and the receive antenna 213b at the receiver 212 can be the switched array antenna 320. In other embodiments, the transmit antenna 213a at the transmitter 211 can be the switched array antenna 320, and the receive antenna 213b at the receiver 212 can be the phased array antenna 310. In yet other embodiments, the transmit antenna 213a at the transmitter 211 can be either the phased array antenna 310 or the switched array antenna 320, and the receive antenna 213b at the receiver 212 can be the single element directional antenna 330. In yet other embodiments, the transmit antenna 213a at the transmitter 211 can be the single element directional antenna 330, and the receive antenna 213b at the receiver 212 can be either the phased array antenna 310 or the switched array antenna 320.

The transmit (TX) function of the transmitter 211 (FIG. 2) includes a signal processing module 214. The signal processing module 214 receives a baseband signal that has undergone an earlier baseband processing, and performs, for example, an inverse Fast Fourier Transform (IFFT) which converts the signal from the frequency domain into a time domain digital signal. In certain embodiments, the signal processing module 214 can include a processor (not shown), e.g., a microprocessor, a digital signal processor (DSP), a programmable gate array (PGA) and the like, for performing the IFFT and other signal processing functions. The digital signal is then converted into an analog waveform by a digital to analog (D/A) function of an RF chain 215, and then transmitted to the receiver 212 via the transmit antenna 213a after analog beamforming (BF) by an analog TX BF function module 216. The transmitter 211 can also include a training control module 221 that is used during an antenna training session. During the antenna training session, the digital signal output from the signal processing module 214 is bypassed to the training control module 221 where at least part of an antenna beamforming algorithm is applied. During the antenna training session, the training control module 221 generates one or more training sequences. The training sequence then flows into the RF chain 215, where it is converted into an analog waveform, and transmitted to the receiver 212 as described above.

The receive (RX) function of the receiver 212 includes an analog RX BF function module 217, which cooperatively with the analog TX BF function 216 provides analog beamforming. A signal transmitted from the transmitter 211 is received by the receiver 212 via the receive antenna 213b. The received signal flows into the analog RX BF function 217. The analog output signal from the analog RX BF function 217 is converted to a digital signal in an RF chain 218, and then converted to a frequency domain baseband signal by, for example, an FFT module inside a signal processing module 219. The frequency domain baseband signal is then output for a further baseband processing. The receiver 212 can also include its own training control module 222 that is used during an antenna training session. During the antenna training session, a digital signal representing a training sequence received from the transmitter 211 is bypassed to the training control module 222 where at least part of the antenna beamforming algorithm is applied.

The antenna training algorithm performed by the training control module 221, 222 depends on the antenna configuration. For example, assume that the transmit antenna 213a is the phased array antenna 310 (FIG. 3a), and the receive antenna 213b is the switched array antenna 320. Then, the part of the antenna beamforming algorithm performed by the training control module 221 at the transmitter 211 can include transmitting training sequences via the phased array antenna configured with different estimated beamforming coefficients, while the part of the antenna beamforming algorithm performed by the training control module 222 can include scanning different antenna sectors of the switched array antenna to receive the training sequences transmitted by the transmitter 211 and computing or estimating a link quality indicator (LQI) associated with the received training sequences. Various measures of LQI can be used. Some embodiments based on LQI employ signal-to-noise ratios (SNRs) associated with the received training sequences. One of the SNR embodiments employs a maximum-likelihood (ML) SNR estimator technique. Other embodiments based on LQI employ received signal strength indicators (RSSIs). Yet other embodiments based on LQI employ signal to noise and interference ratios (SNIRs).

I. Antenna Beamforming Protocol that Supports Heterogeneous Antenna Configurations with Varying Number of Antenna Elements A wireless network needs to support diverse device configurations, e.g., devices with different types of antennas and antenna elements. Certain embodiments provide a general efficient beamforming protocol with features that can support diverse device configurations. In one feature, information regarding a type of antenna and a number of elements in the antenna is exchanged during association. In the beamforming protocol, one of the devices in the network, e.g., a transmitter, sends an association request command to another device, e.g., a receiver, in the network and the receiver responds by sending an association response command to the transmitter. The association request command can include a physical layer (PHY) capability information element to indicate the transmitter's PHY capability. The association response command can include the PHY capability information element (IE) to indicate the receiver's PHY capability. In an infrastructure-based network, the receiver can be a coordinator. An example PHY capability IE 400 is shown in FIG. 4. The PHY capability IE 400 includes an Informational Element (IE) index element 410, a Length index 420, a Single Carrier (SC) mode support field 430, an Orthogonal Frequency Division Multiplexing (OFDM) mode support field 440 and an Explicit/Implicit feedback field 450. An example antenna support element 500 that can be included in the PHY capability IE 400 is shown in FIG. 5. The example antenna support element 500 includes a first field 510 indicating a number of transmitter (TX) antenna elements, a second field 520 indicating a number of receive (RX) antenna elements, a third field 530 indicating an antenna type of the transmitter, and a fourth field 540 indicating an antenna type of the receiver.

The beam search training sequence can use a pseudo-random number (PN) sequence. The sequence can be any random sequence with constant amplitude and good autocorrelation properties, such as an M-sequence. The PN sequence can be modulated by digital modulation, such as Binary Phase Shift Keying (BPSK), Quadrature Phase Shift Keying (QPSK), Differential Binary Phase Shift Keying (DBPSK) or Offset Quadrature Phase Shift Keying (OQPSK), for transmission. In some embodiments, the same training sequence is repeated a number of times in the temporal domain, while at the same time, the spatial pattern for each repetition of the training sequence can be varying during the training process. In this application, the term "training sequence length" refers to the number of repeated training sequences in the temporal domain.

In the current practice, the training sequence length is fixed to a certain number of maximum antennas, e.g., Nmax. The current practice, however, can lead to a considerable waste in training time since the antennas involved in the training may have less than Nmax number of antenna elements. In certain embodiments of the beamforming protocol described herein, however, the waste in training time due to a fixed Nmax is avoided by adapting the training sequence length to certain characteristics of at least one of the transmit and receive antennas, such as the types of antennas and numbers of antenna elements. FIG. 6 shows an example training sequence where the training sequence length is adapted to a particular type of antenna and the number of antenna elements. The example training sequence includes N temporally-repeated BPSK modulated pseudo random noise (PN) sequences. The PN sequences can be any random sequences such as M-sequences, where N depends on the number and type of antennas at the transmitter and receiver. For example, as will be described below, if one of the transmit and receive antennas is a phased array antenna, the training sequence length, N, can be set to the number of weight vectors spanning the phase space for the phased array antenna. On the other hand, if the transmit and receive antennas are both switched array antennas, the training sequence length, N, can be set to the number of antenna elements, i.e., sectors, for the switched array antennas.

In the following paragraphs, training sequences and protocols are described in detail for certain heterogeneous device configurations in which a phased array antenna device is coupled with a switched array antenna device. It is hereinafter assumed for these examples that the directional transmission—the direction of the data transmission for which the antenna is being trained—is from STA1 to STA2 and that the antenna at the STA1 has N1 antenna elements and the antenna at the STA2 has N2 antenna elements.

STA1: Phased Array Antenna Device/STA2: Switched Array Antenna Device

Figure 7:
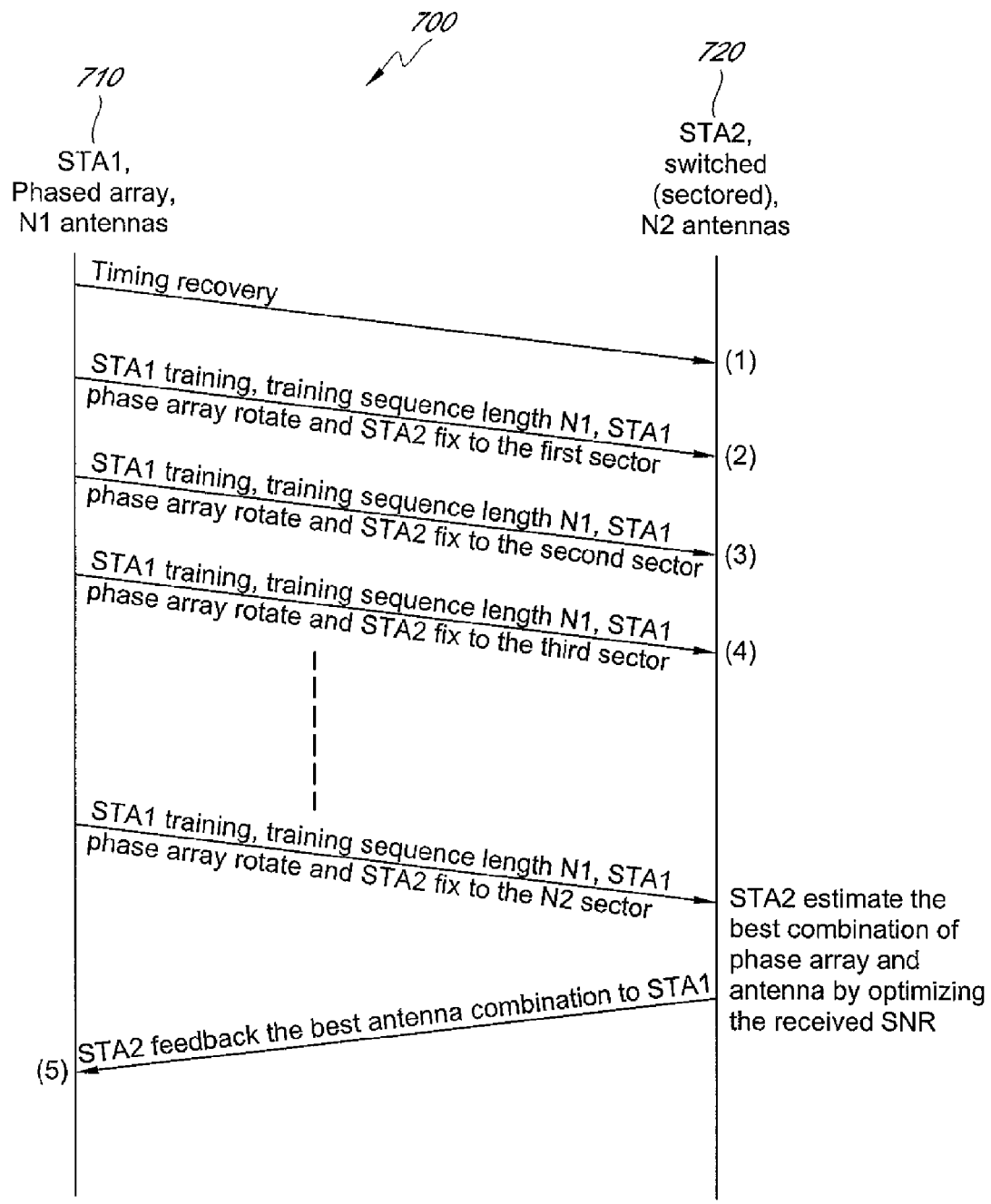
FIG. 7 is a message exchange chart illustrating an example antenna training protocol involving a phased array antenna at the transmitter and a switched array antenna at the receiver.

Once the antenna types are determined as a phased array antenna at the transmitter (STA1) and a switched array antenna at the receiver (STA2) from the association procedure described above, the protocol can follow the example procedure 700 illustrated in FIG. 7 and described below. For the purpose of the discussion hereafter, the following is assumed: The phased array antenna includes N1 antenna elements, and the phase space for the phased array antenna is defined by N1 weight vectors. The switched array antenna includes N2 antenna sectors.

a. Beam Search Stage 1 (Timing Recovery) Training Sequence

During a first beam search stage (Stage 1), STA1 710, e.g., the transmitter 211 (FIG. 2), transmits a Stage 1 training sequence (1) that is used for timing recovery estimation and/or automatic gain control (AGC) to STA2 720, e.g., the receiver 212 (FIG. 2).

b. Beam Search Stage 2 (STA1 Training) Training Sequence

During a second beam search stage (Stage 2), the STA1 710 transmits a Stage 2 training sequence (2) to the STA2 720. The training sequence length is again set to N1. During the Stage 2 training sequence (2), the STA1 beamforming vector switches between phase vectors within the same set of weight vectors as in Stage 1, while the STA2 is fixed to the first sector (direction) of the switched array antenna.

c. Beam Search Stages 3, 4, . . . , N2+1 (STA1 Training) Training Sequences

During beam search stages 3, 4, . . . , N2+1, the STA1 710 transmits Stage 3, 4, . . . N2+1 training sequences (4) to the STA2 720. The training sequence lengths are again set to N1. During each of the stages, the STA1 beamforming vector switches between phase vectors within a same set of weight vectors as in stage 1, while the STA2 is fixed to a second sector, a third sector, . . . , and N2$^{th}$ sector, respectively.

During or after the reception of the estimation sequences, the STA2 720 optimizes the received SNRs or other LQI in other embodiments. The SNR optimization can include estimating SNR values for N1×N2 training sequences received by the STA2 and finding the highest SNR value. This process leads to a set of an optimal transmit phase vector and an optimal receive antenna sector that is determined to yield the highest SNR value among N1×N2 possible combinations of phase vectors and antenna sectors.

d. Stage N2+2, Feedback

After the SNR optimization, the STA2 720 transmits a feedback message (5) to the STA1 710. The feedback message (5) indicates the optimal transmit phase vector at STA1 that is determined to yield the highest SNR value. Subsequently, the STA1 710 uses the optimal transmit phase vector to tune its phased array antenna and transmit data to the STA2 via the phased array antenna so tuned.

STA1: Switched Array Antenna Device/STA2: Phased Array Antenna Device

Figure 8:
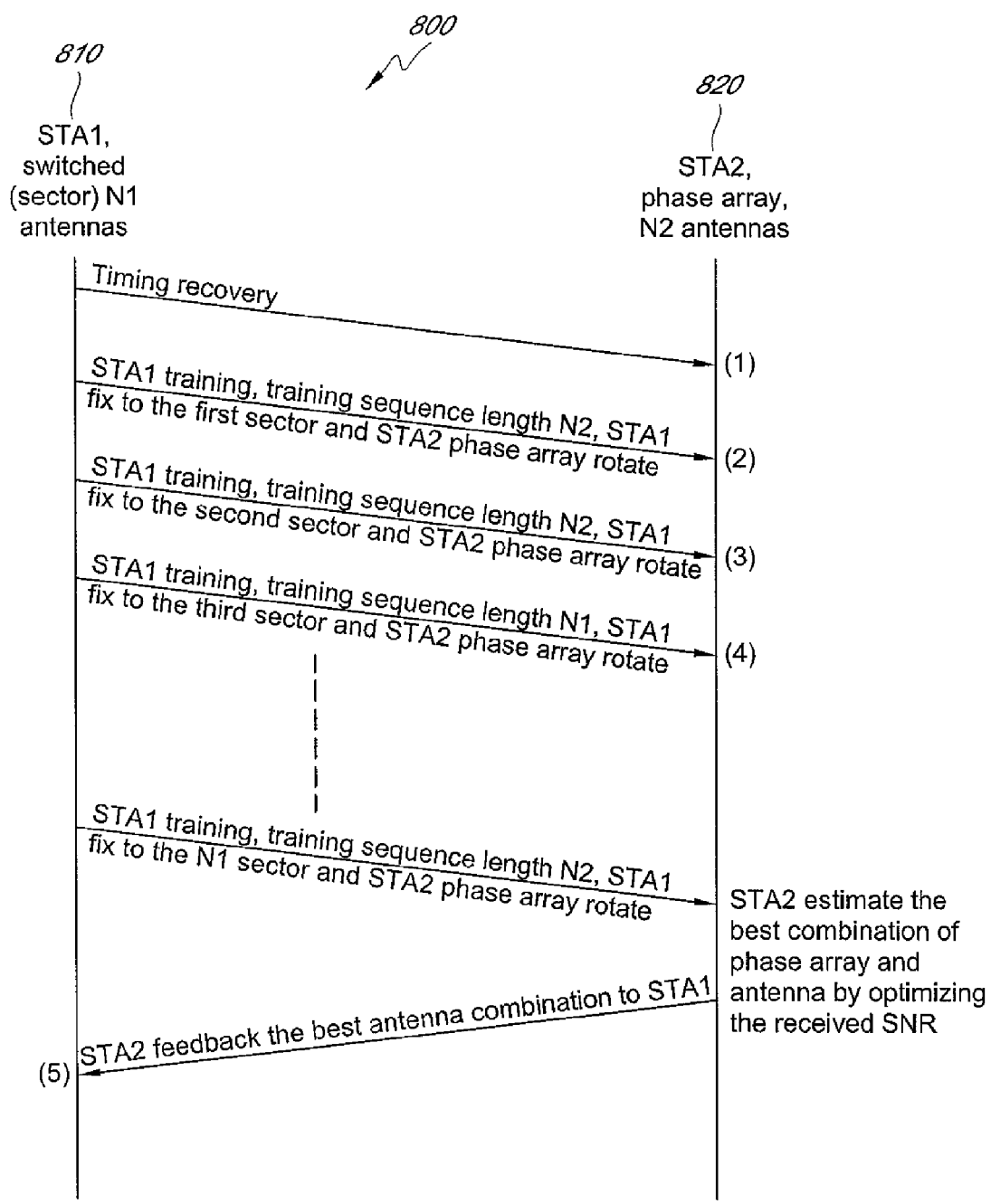
FIG. 8 is a message exchange chart illustrating an example antenna training protocol involving a switched array antenna at the transmitter and a phased array antenna at the receiver.

Once the antenna types are determined as a switched array antenna at the transmitter (STA1) and a phased array antenna at the receiver (STA2) from the association procedure described above, the protocol can follow the example procedure 800 illustrated in FIG. 8 and described below. For the purpose of the discussion hereafter, the following is assumed: The switched array antenna at STA1 includes N1 antenna sectors. The phased array antenna at STA2 includes N2 antenna elements, and the phase space for the phased array antenna is defined by N2 weight vectors.

a. Beam Search Stage 1 (Timing Recovery) Training Sequence

During a first beam search stage (Stage 1), STA1 810 transmits a Stage 1 training sequence (1) that is used for timing recovery estimation and/or automatic gain control (AGC) to STA2 820.

b. Beam Search Stage 2 (STA2 Estimation) Training Sequence

During a second beam search stage (Stage 2), the STA1 810 transmits a Stage 2 training sequence (2) to the STA2 820. The training sequence length is set to N2. During the course of the Stage 2 training sequence (2), the STA2 beamforming vector switches between phase vectors within the same set of weight vectors as in Stage 1, while the STA1 is fixed to the first sector (direction) of the switched array antenna.

c. Beam Search Stages 3, 4, . . . , N1+1 (STA2 Estimation) Training Sequences

During beam search stages 3, 4, . . . , N1+1, the STA1 810 transmits Stage 3, 4, . . . N1+1 training sequences (4) to the STA2 820. The training sequence lengths are again set to N2. During each of the stages, the STA2 phase vector switches between phase vectors within the same set of weight vectors as in stage 1, while the STA1 is fixed to a second sector, a third sector, . . . , and N1$^{th}$ sector, respectively.

During or after the reception of the estimation sequences, the STA2 820 optimizes the received SNRs or other LQI in other embodiments. The SNR optimization can include estimating SNR values for N1×N2 training sequences received by the STA2 and finding the highest SNR value. This process leads to a set of an optimal receive phase vector and an optimal transmit antenna sector that is determined to yield the highest SNR value among N1×N2 possible combinations of phase vectors and antenna sectors.

d. Stage N1+2 Feedback

After the SNR optimization, the STA2 820 transmits a feedback message (5) to the STA1 810. The feedback message (5) indicates the optimal transmit antenna sector at STA1 that is determined to yield the highest SNR value. Subsequently, the STA1 810 fixes the switched array antenna to the optimal antenna sector and transmits data to the STA2 via the switched array antenna so fixed.

II. Training Overhead Savings

As indicated in Section I above, in the current practice, the training sequence length is fixed to a certain number of maximum antenna elements, e.g., Nt_max for the transmit antenna and Nr_max for the receive antenna. This fixed training sequence scheme leads to a considerable waste. Therefore, a beamforming protocol such as the ones described above that adapts the training sequence length to the actual number and types of antennas involved can bring about a considerable savings on training overhead. For the purpose of the following discussion, assume that the numbers of antenna elements are Nt (<=Nt_max) and Nr (<=Nr_max) for the STA1 (transmitter) and the STA2 (receiver), respectively. The Nt and Nr can correspond to N1 and N2 for the STA1 and STA2 in the examples of FIGS. 7 and 8 described above.

Heterogeneous Configurations with Phased Array Antenna and Switched Array Antenna Here, the amount of savings is estimated for the heterogeneous antenna configurations in which a phased array antenna device is coupled with a switched array antenna device. The same amount of savings can be obtained for the following two possible cases: 1) the STA1 is the phased array antenna device, and the STA2 is the switched array antenna device; and 2) the STA1 is the switched array antenna device, and the STA2 is the phased array antenna device.

For both cases, the training overhead is N1×N2. As indicated above, in the current practice, the training sequence length is fixed to a certain number of maximum antennas. Assume that the fixed maximum antenna numbers are Nt_max and Nr_max for the transmitter and receiver antennas, respectively. Then the required training overhead is Nt_max×Nr_max. The amount of savings is thus:

1−[(N1×N2)/(Nt_max×Nr_max)]

Depending on the actual number of antennas and the Nt_max and Nr_max values, the savings varies. For example, when N1=N2=9 and Nt_max=Nr_max=36, the required overhead is only 12.5% compared with the conventional one, with overhead savings of 87.5% achieved.

Homogeneous Configuration with Phased Array Antennas

Figure 9:
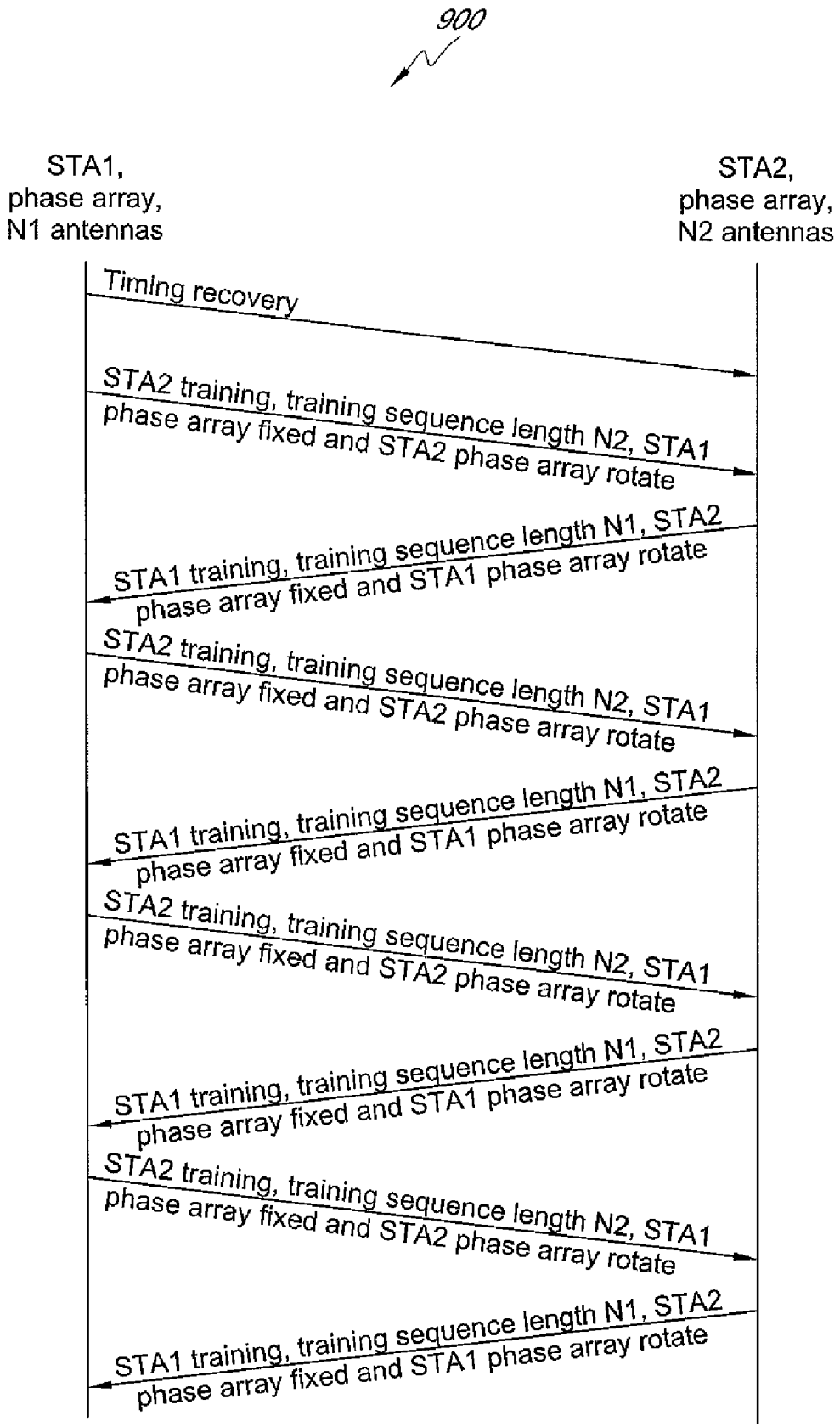
FIG. 9 is a message exchange chart illustrating an example antenna training protocol involving a phased array antenna at the transmitter and a phased array antenna at the receiver.

Here, the amount of savings is estimated for the homogeneous antenna configuration in which a phased array antenna device is coupled with another phased array antenna device. Training sequences for this configuration are described in the U.S. patent application Ser. No. 11/881,978. It must be noted, however, that in the system and method of the present application, the training sequence lengths for the transmitter (STA1) and the receiver (STA2) are adapted to be N1 and N2, respectively. These correspond to the total numbers of antenna elements (and weight vectors) for the phased array antennas at the transmitter and the receiver, respectively, instead of being fixed to some arbitrary maximum numbers, e.g., Nt_max and Nr_max. An example training sequence for this configuration using an explicit feedback is shown in FIG. 9.

The training overhead is proportional to N1+N2 for this configuration. Assuming the fixed maximum antenna numbers for the current practice are Nt_max and Nr_max for the transmitter and receiver antennas, respectively, the amount of savings that can be achieved is given by:

1−[(N1+N2)/(Nt_max+Nr_max)]

Again assuming that Nt max Nr_max=36 and N1=N2=9, the required overhead is only 25% compared with the conventional one, with a saving of 75% achieved.

Homogeneous Configuration with Switched Array Antennas

Figure 10:
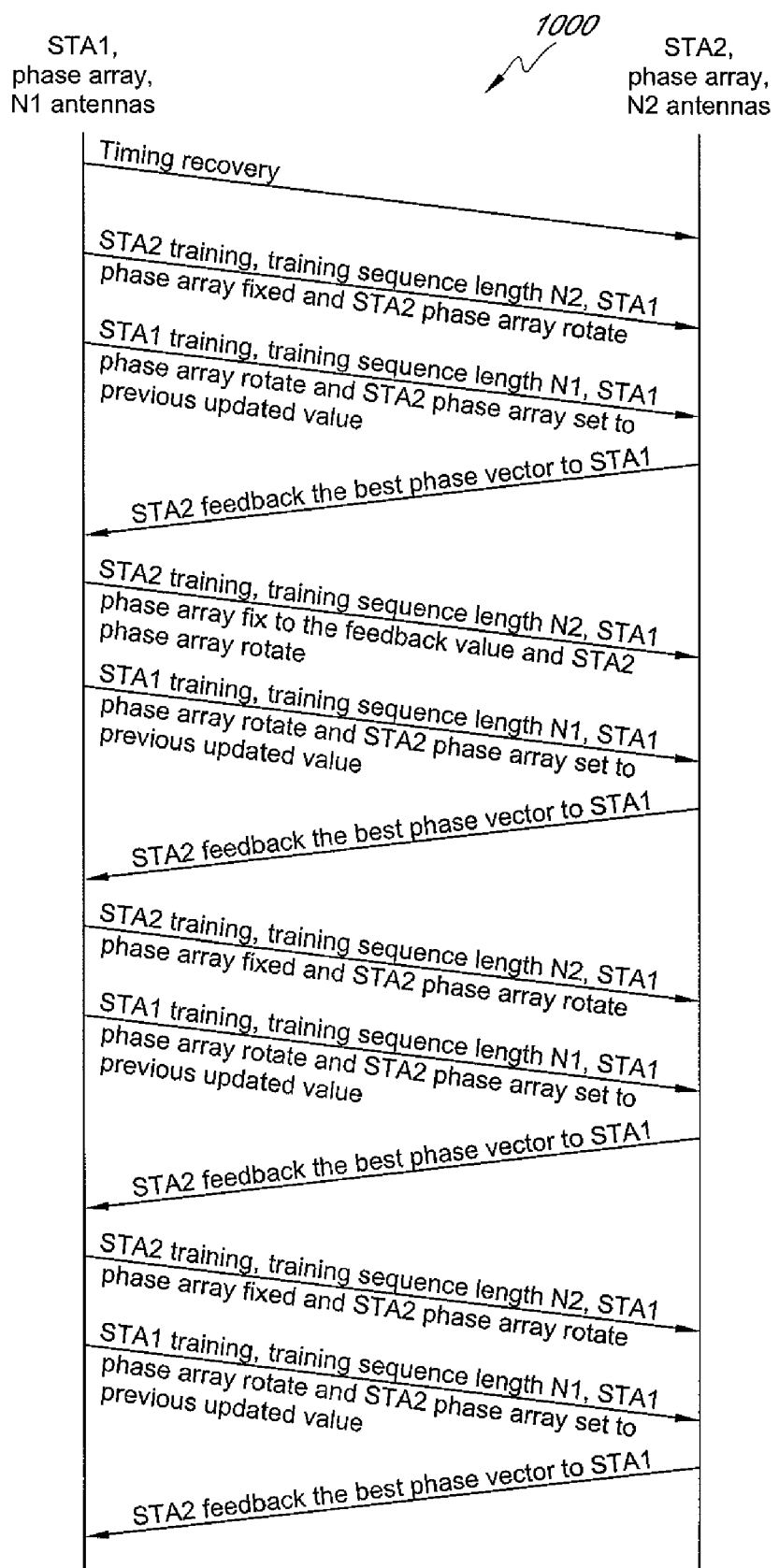
FIG. 10 is a message exchange chart illustrating another example antenna training protocol involving a phased array antenna at the transmitter and a phased array antenna at the receiver.
Figure 11:
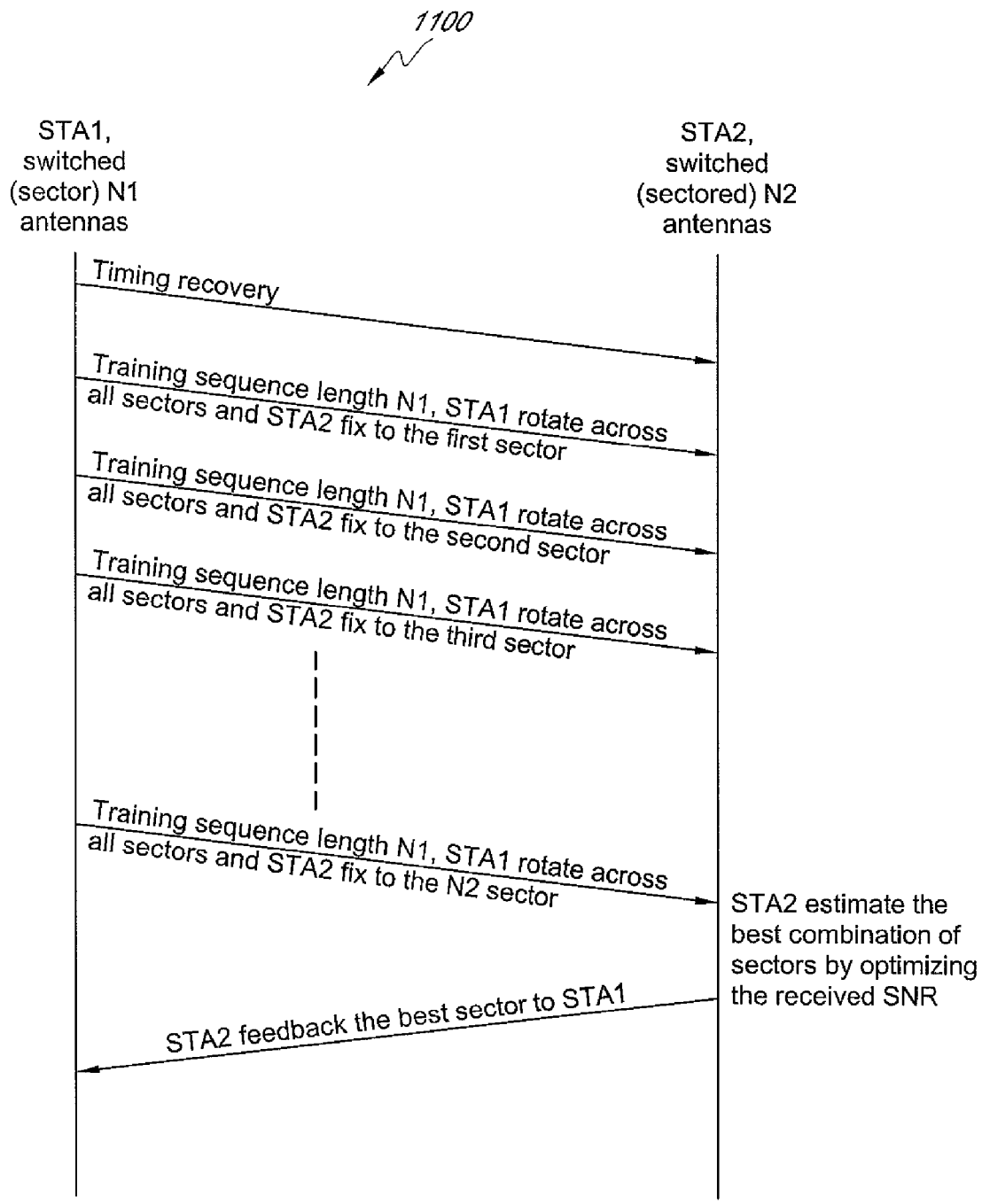
FIG. 11 is a message exchange chart illustrating an example antenna training protocol involving a switched array antenna at the transmitter and a switched array antenna at the receiver.

Here, the amount of savings is estimated for the homogeneous antenna configuration in which a switched array antenna device is coupled with another switched array antenna device. Training sequences for this configuration are described in detail in the U.S. patent application Ser. No. 11/881,978. It must be noted, however, that in the present system and method, the training sequence lengths for the transmitter (STA1) and the receiver (STA2) are adapted to be N1 and N2, respectively. These correspond to the total numbers of antenna sectors for the switched array antennas at the transmitter and the receiver, respectively, instead of being fixed to some arbitrary numbers, e.g., Nt_max and Nr_max. An example training sequence where the training sequence lengths are adapted to the total numbers (e.g., N1 and N2) of antenna elements for the switched array antennas at the transmitter and the receiver is shown in FIG. 10.

For this configuration, the training overhead is proportional to Nt×Nr as in the heterogeneous case involving a phased array antenna and a switched array antenna. Therefore, training overhead savings for this configuration is the same as that for the heterogeneous configuration. Again assuming that Nt_max=Nr_max=36 and N1=N2=9, the required overhead is only 12.5% compared with the conventional one, with a saving of 87.5% achieved.

The above-described method and system for an efficient transmit and receive beamforming protocol that adapts the training sequence length on the number of antennas may be realized in a program format to be stored on a computer readable recording medium that includes any kinds of recording devices for storing computer readable data, for example, a CD-ROM, a DVD, a magnetic tape, a memory (e.g., capable of storing firmware), memory card and a disk, and may also be realized in a carrier wave format (e.g., Internet transmission or Bluetooth transmission.) In some embodiments, the transmitter 211 or the receiver 212 shown in FIG. 2 includes the computer readable recording medium and can also include a processor, controller, or other computing device.

Conclusion

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A method of training antennas for two devices equipped with phased array antennas in a wireless network, the method comprising:
   a) transmitting a first estimation training sequence of length N2 via a transmit phased array antenna, wherein N2 corresponds to a number of antenna element at a second station (STA2) acting as a receiver and wherein a transmit beamforming vector (BV) of the transmit phased array antenna of a first station (STA1) acting as a transmitter is fixed to a first transmit BV while a receive BV of a receive phased array antenna of STA2 is switched between phase vectors within N2 weight vectors;
   b) transmitting a second estimation training sequence of a length N1 via the transmit phased array antenna, wherein N1 corresponds to a number of antenna elements at STA1 and wherein the transmit BV is switched between phase vectors within N1 weight vectors while the receive BV of the receive phased array antenna of STA2 is fixed to a first receive BV;
   c) receiving a feedback message indicative of a first transmit BV for STA1;
   d) transmitting a next estimation training sequence of length N2, wherein the transmit BV is fixed to the first transmit BV while the receive BV of STA2 is switched between phase vectors within N2 weight vectors;
   e) transmitting a next estimation training sequence of length N1, wherein the transmit BV is switched between phase vectors within N1 weight vectors while the receive BV is fixed to an updated receive BV vector;
   f) receiving a next feedback message indicative of a new transmit BV for STA1;
   g) repeating d)-f) for a finite number of times; and
   h) transmitting data via the transmit phased array antenna fixed to the last transmit BV indicated by the last feedback message.

2. The method of claim 1, wherein the transmit BV for STA1 indicated by the feedback message is determined at STA2 acting as a receiver based at least in part on an estimated link quality indicator (LQI) associated with a previous estimation training sequence.

3. The method of claim 1, wherein the updated receive BV vector of e) is determined based in part on the next estimation training sequence of d).

4. The method of claim 1, wherein b) and c) are performed before a).

5. The method of claim 1, wherein e) and f) are performed before d).

6. The method of claim 1, wherein d)-f) are repeated until a signal to noise ratio (SNR) for the estimation training sequence exceeds a threshold value.

7. A system for training antennas for two devices equipped with phased array antennas in a wireless network, the system comprising:
  a transmit phased array antenna of a first station (STA1) acting as a transmitter; and
  a processor configured to:
    a) transmit a first estimation training sequence of length N2 via the transmit phased array antenna, wherein N2 corresponds to a number of antenna element at a second station (STA2) acting as a receiver and wherein a transmit beamforming vector (BV) of the transmit phased array antenna of STA1 acting as a transmitter is fixed to a first transmit BV while a receive BV of a receive phased array antenna of STA2 is switched between phase vectors within N2 weight vectors;
    b) transmit a second estimation training sequence of a length N1 via the transmit phased array antenna, wherein N1 corresponds to a number of antenna elements at STA1 and wherein the transmit BV is switched between phase vectors within N1 weight vectors while the receive BV of the receive phased array antenna of STA2 is fixed to a first receive BV;
    c) receive a feedback message indicative of a first transmit BV for STA1;
    d) transmit a next estimation training sequence of length N2, wherein the transmit BV is fixed to the first transmit BV while the receive BV of STA2 is switched between phase vectors within N2 weight vectors;
    e) transmit a next estimation training sequence of length N1, wherein the transmit BV is switched between phase vectors within N1 weight vectors while the receive BV is fixed to an updated receive BV vector;
    f) receive a next feedback message indicative of a next transmit BV for STA1;
    g) repeat d)-f) for a finite number of times; and
    h) transmit data via the transmit phased array antenna fixed to the last transmit BV for STA1 indicated by the last feedback message.

8. The system of claim 7, wherein the transmit BV for STA1 indicated by the feedback message is determined at STA2 acting as a receiver based at least in part on an estimated link quality indicator (LQI) associated with a previous estimation training sequence.

9. The system of claim 7, wherein the updated receive BV vector of e) is determined based in part on the next estimation training sequence of d).

10. The system of claim 7, wherein b) and c) are performed before a).

11. The system of claim 7, wherein e) and f) are performed before d).

12. The system of claim 7, wherein d)-f) are repeated until a signal to noise ratio (SNR) for the estimation transmitting sequence exceeds a threshold value.

13. A method of training antennas for two devices equipped with phased array antennas in a wireless network, the method comprising:
  a) transmitting a first transmit estimation training sequence of length N2 via a transmit phased array antenna, wherein N2 corresponds to a number of antenna element at a second station (STA2) acting as a receiver and wherein a transmit beamforming vector (BV) of the transmit phased array antenna of a first station (STA1) acting as a transmitter is fixed to a first transmit BV while a receive BV of a receive phased array antenna of STA2 is switched between phase vectors within N2 weight vectors;
  b) receiving a first receive estimation training sequence of length N1 from STA2, wherein N1 corresponds to a number of antenna elements at STA1 and wherein a transmit BV of the phased array antenna of STA2 acting as a transmitter is fixed to a first transmit BV while the receive BV of the phased array antenna of STA1 acting as a receiver is switched between phased vectors within N1 weight vectors;
  c) transmitting a next transmit estimation training sequence of length N2 via the transmit phased array antenna, wherein the transmit beamforming vector (BV) is fixed to a new transmit BV while the receive BV is switched between phase vectors within N2 weight vectors;
  d) receiving a next receive estimation training sequence of length N1 from STA2, wherein the transmit BV of the phased array antenna of STA2 acting as a transmitter is fixed to a new transmit BV while the receive BV of the phased array antenna of STA1 acting as a receiver is switched between phased vectors within N1 weight vectors;
  e) repeating c)-d) for a finite number of times; and
  f) transmitting data via the transmit phased array antenna fixed to a selected transmit BV.

14. The method of claim 13, wherein the transmit BV is selected based at least in part on estimation of link quality indicators (LQIs) associated with the transmit and receive estimation training sequences.

15. The method of claim 14, wherein the estimation of LQIs include an estimation of signal to noise ratio (SNR).

16. The method of claim 13, wherein c)-d) are repeated until a signal to noise ratio (SNR) for at least one of the transmit and receive estimation transmitting sequences exceeds a threshold value.

17. A system for training antennas for two devices equipped with phased array antennas in a wireless network, the system comprising:
  a transmit phased array antenna of a first station (STA1) acting as a transmitter; and
  a processor configured to:
    a) transmit a first transmit estimation training sequence of length N2 via the transmit phased array antenna, wherein N2 corresponds to a number of antenna element at a second station (STA2) acting as a receiver and wherein a transmit beamforming vector (BV) of the transmit phased array antenna is fixed to a first transmit BV while a receive BV of a receive phased array antenna of STA2 is switched between phase vectors within N2 weight vectors;
    b) receive a first receive estimation training sequence of length N1 from STA2, wherein N1 corresponds to a number of antenna elements at STA1 and wherein a transmit BV of the phased array antenna of STA2 acting as a transmitter is fixed to a first transmit BV while the receive BV of the phased array antenna of STA1 acting as a receiver is switched between phased vectors within N1 weight vectors;
c) transmit a next transmit estimation training sequence of length N2 via the transmit phased array antenna, wherein the transmit beamforming vector (BV) is fixed to a new transmit BV while the receive BV is switched between phase vectors within N2 weight vectors;
d) receive a next receive estimation training sequence of length N1 from STA2, wherein the transmit BV of the phased array antenna at STA2 acting as a transmitter is fixed to a new transmit BV while the receive BV of the phased array antenna at STA1 acting as a receiver is switched between phased vectors within N1 weight vectors;
e) repeat c)-d) for a finite number of times; and
f) transmit data via the transmit phased array antenna fixed to a selected transmit BV.

18. The system of claim 17, wherein the transmit BV is selected based at least in part on estimation of link quality indicators (LQIs) associated with the transmit and receive estimation training sequences.

19. The system of claim 18, wherein the estimation of LQIs include an estimation of signal to noise ratio (SNR).

20. The system of claim 17, wherein c)-d) are repeated until a signal to noise ratio (SNR) for at least one of the transmit and receive estimation transmitting sequences exceeds a threshold value.

21. A method of training antennas for two devices equipped with switched array antennas in a wireless network, the method comprising:
a) transmitting a first estimation training sequence of length N1 via a transmit switched array antenna, wherein N1 corresponds to a number of transmit antenna sectors for the transmit switched array antenna at a first station (STA1) acting as a transmitter and wherein the transmit switched array antenna is switched between N1 transmit antenna sectors while a receive switched array antenna at a second station (STA2) acting as a receiver is fixed to a first receive antenna sector;
b) transmitting a next estimation training sequence of length N1 via the transmit switched array antenna and wherein the transmit switched array antenna at STA1 is switched between N1 transmit antenna sectors while the receive switched array antenna at STA2 is fixed to a new receive antenna sector;
c) repeating b) for a finite number of times;
d) receiving a feedback message indicative of a transmit antenna sector for STA1; and
e) transmitting data via the transmit switched array antenna fixed to the transmit antenna sector indicated by the feedback message.

22. The method of claim 21, wherein b) is repeated N2-2 times, wherein N2 corresponds to a number of receive antenna sectors for the receive switched array antenna at STA2 acting as a receiver.

23. The method of claim 21, wherein the transmit antenna sector for STA1 indicated by the feedback message is determined at STA2 based at least in part on an estimated link quality indicator (LQI) associated with one or more transmitted estimation training sequences.

24. The method of claim 23, wherein the estimated LQI includes an estimated signal to noise ratio (SNR).

25. The method of claim 24, wherein the transmit antenna sector for STA1 indicated by the feedback message is the transmit antenna sector that yields the highest estimated SNR.

26. A system for training antennas for two devices equipped with switched array antennas in a wireless network, the system comprising:
a transmit switched array antenna of a first station (STA1) acting as a transmitter; and
a processor configured to:
a) transmit a first estimation training sequence of length N1 via the transmit switched array antenna, wherein N1 corresponds to a number of transmit antenna sectors for the transmit switched array antenna at a first station (STA1) acting as a transmitter and wherein the transmit switched array antenna is switched between N1 transmit antenna sectors while a receive switched array antenna at a second station (STA2) acting as a receiver is fixed to a first receive antenna sector;
b) transmit a next estimation training sequence of length N1 via the transmit switched array antenna and wherein the transmit switched array antenna at STA1 is switched between N1 transmit antenna sectors while the receive switched array antenna at STA2 is fixed to a new receive antenna sector;
c) repeat b) for a finite number of times;
d) receive a feedback message indicative of a transmit antenna sector for STA1; and
e) transmit data via the transmit switched array antenna fixed to the transmit antenna sector indicated by the feedback message.

27. The system of claim 26, wherein b) is repeated N2-2 times, wherein N2 corresponds to a number of receive antenna sectors for the receive switched array antenna at STA2 acting as a receiver.

28. The system of claim 26, wherein the transmit antenna sector for STA1 indicated by the feedback message is determined at STA2 based at least in part on an estimated link quality indicator (LQI) associated with one or more transmitted estimation training sequences.

29. The system of claim 28, wherein the estimated LQI includes an estimated signal to noise ratio (SNR).

30. The system of claim 29, wherein the transmit antenna sector for STA1 indicated by the feedback message is the transmit antenna sector that yields the highest estimated SNR.

* * * * *